United States Patent
Brunner (10) Patent No.: US 8,295,610 B1
(45) Date of Patent: Oct. 23, 2012

(54) FEATURE SCALING FOR FACE DETECTION

(75) Inventor: Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 459 days.

(21) Appl. No.: 12/693,179

(22) Filed: Jan. 25, 2010

Related U.S. Application Data (60) Provisional application No. 61/292,638, filed on Jan. 6, 2010.

(51) Int. Cl.
G06K 9/46 (2006.01)
G06K 9/32 (2006.01)

(52) U.S. Cl. .................. 382/201; 382/190; 382/298

(58) Field of Classification Search .......... 382/118, 382/164, 190, 167, 274, 298, 169, 171, 172, 382/181, 195, 197, 201, 237, 254
See application file for complete search history.

(56) References Cited

U.S. PATENT DOCUMENTS

| | | | | |
|---|---|---|---|---|
| 5,473,709 | A * | 12/1995 | Aoki | 382/258 |
| 5,748,197 | A * | 5/1998 | Guibas et al. | 345/672 |
| 5,751,852 | A * | 5/1998 | Marimont et al. | 382/180 |
| 5,781,650 | A | 7/1998 | Lobo et al. | |
| 6,148,092 | A | 11/2000 | Qian | |
| 7,333,648 | B2 * | 2/2008 | Edic et al. | 382/131 |
| 7,551,173 | B2 * | 6/2009 | Cao | 345/441 |
| 7,587,068 | B1 | 9/2009 | Steinberg et al. | |
| 2003/0007685 | A1 | 1/2003 | Tsai et al. | |
| 2007/0172099 | A1 * | 7/2007 | Park et al. | 382/118 |
| 2008/0144892 | A1 | 6/2008 | Lu et al. | |
| 2008/0205712 | A1 | 8/2008 | Ionita et al. | |
| 2010/0030578 | A1 * | 2/2010 | Siddique et al. | 705/3 |
| 2010/0145898 | A1 * | 6/2010 | Malfliet et al. | 706/47 |

FOREIGN PATENT DOCUMENTS

EP 14991 A3 3/2006

OTHER PUBLICATIONS

Tsapatsoulis et al; "Facial Image Indexing in Multimedia Databases"; Pattern Analysis & Applications; 2001; 4:93-107.
Ming-Hsuan Yang; "Recent Advances in Face Detection"; Honda Research Institute; ICPR 2004; pp. 1-93; Mountain View, California, USA.
Parallelizing Cascaded Face Detection; Fish & Richardson; U.S. Appl. No. 12/693,204, filed Jan. 25, 2010; 29 pages.

(Continued)

*Primary Examiner* — Sheela Chawan
(74) *Attorney, Agent, or Firm* — Wong, Cabello, Lutsch, Rutherford & Brucculeri, L.L.P.

(57) ABSTRACT

A feature used in face detection can be applied to an image portion and can be scaled to fit differently sized image areas. If a feature is positioned with respect to an image area such that a vertex of the feature is aligned with a non-integer pixel location, at least one dimension of the filter can be rounded. A dimension to be rounded further can correspond to a directional component of the feature. For instance, contrast regions within the feature can be arranged horizontally, such that the vertical dimension represents a directional component. A rounding rule associated with the feature can be used in rounding a dimension corresponding to a directional component, such that a size ratio between the contrast regions is maintained. In some instances, the rounding rule can specify a factor that is a positive integer determined based on the number of contrast regions in the feature.

21 Claims, 6 Drawing Sheets

OTHER PUBLICATIONS

Yang et al; "Detecting Faces in Images: A Survey"; IEEE Transactions on Pattern Analysis and Machine Intelligence; Jan. 2002; vol. 24, No. 1, pp. 34-58.

Hjelmas et al; "Face Detection: A Survey"; Computer Vision and Image Understanding 83; 2001; pp. 236-274; Academic Press.

Luminance Adjusted Face Detection; Fish & Richardson; U.S. Appl. No. 12/912,620, filed Oct. 26, 2010, 37 pages.

Yun et al; "Local Normalization with Optimal Adaptive Correlation for Automatic and Robust Face Detection on Video Sequences"; Tenth IEEE International Symposium on Multimedia; 2008; pp. 160-165.

Viola et al; "Robust Real-time Object Detection"; Second International Workshop on Statistical and Computational Theories of Vision—Modeling, Learning, Computing, and Sampling; Jul. 13, 2001; pp. 1-25; Vancouver, Canada.

* cited by examiner

FEATURE SCALING FOR FACE DETECTION

PRIORITY CLAIM AND RELATED
APPLICATIONS

This patent document claims priority from U.S. Provisional Application No. 61/292,638 entitled "Feature Scaling for Face Detection" and filed Jan. 6, 2010, which is incorporated by reference as part of the disclosure of this document.

TECHNICAL FIELD

The present disclosure relates to analyzing and processing digital image data to identify image regions depicting faces, and to rounding features used to detect faces to correspond to pixel locations in an image.

BACKGROUND

Digital images are being used in increasingly more applications. In many of those applications, automated analysis of digital images can be performed to provide either or both of face detection and face recognition. In face detection, an image region depicting a face is identified. In face recognition, a detected face is associated with a known individual. Face detection and face recognition can be used for a wide variety of tasks, including image enhancement, content-based retrieval, automatic identification, and image database management. For instance, in image processing applications, face detection can be used to automatically perform enhancements, such as red-eye correction and contrast adjustment. Further, face recognition can be used in conjunction with search applications retrieve images that depict a particular individual.

Numerous approaches to face detection have been developed, including neural networks, skin-tone techniques, eigenface/eigenvector, and clustering. A neural network can be trained to locate faces in digital images using one or more training sets that include face images and non-face images. The performance of a neural network will depend on its training. Skin-tone techniques utilize color-based analysis to identify regions in a digital image that primarily consist of colors associated with a predetermined skin-tone color space. Eigenface or eigenvector processing relies on determining a standardized face based on the statistical analysis of a large number of faces and analyzing digital images with respect to the eigenface. Clustering operates to identify clusters of face-data within which variance is low and non-face data regions that have high-variance from the face-data. These approaches require significant processing and thus typically do not provide real-time face detection.

Real-time face detection algorithms also have been developed, such as the Viola-Jones algorithm. The Viola-Jones algorithm searches pixel sub-windows of a candidate window using multiple classifiers, with each classifier configured to select particular visual features from a set of possible visual features. The features used by the Viola-Jones detection framework are characterized as rectangular areas. Different types of features can be defined, including both horizontal and vertical features. The value of a feature is computed by subtracting the sum of the image pixels in one or more feature regions from the sum of the image pixels in one or more other feature regions. Further, the classifiers are grouped in stages, which are cascaded. As a result, only sub-windows that pass the classifiers of the current stage are submitted for further analysis to the classifiers of a subsequent stage. Thus, at least some of the sub-windows that do not represent face data can be discarded early in the analysis.

SUMMARY

A feature (or filter) used to perform face detection can be mapped to any portion of an image and can be scaled to fit differently sized image areas. If a feature is mapped to an image area such that a vertex or an edge is aligned with a non-integer (or fractional) pixel location, one or more dimensions of the filter can be rounded. The present inventor recognized a need to perform the rounding to ensure that the corresponding regions within the feature are maintained at an equal size ratio. Further, the present inventor recognized a need to perform the scaling in accordance with one or more directional components of the feature. For instance, if the contrast regions of a feature have a vertical component, the rounding can be performed in accordance with a rule that controls the horizontal dimension (or size) of the feature. Further, if the contrast regions of a feature have an horizontal component, the rounding can be performed in accordance with a rule that controls the vertical dimension of the feature.

The present inventor also recognized the need to define rounding rules based on the number of contrast regions associated with a feature. For instance, if a feature includes two contrast regions, a rounding rule can be specified that requires at least one dimension of the feature to be rounded to a pixel dimension that is a multiple of two. Further, if a feature includes three contrast regions, a rounding rule can be specified that requires at least one dimension of the feature to be rounded to a pixel dimension that is a multiple of three. Additionally, the need to store, in an array, threshold values weighted to correspond to a particular feature size also was recognized.

Additionally, in performing a comparison of the contrast regions within a feature, points corresponding to the contrast regions are read from memory. The present inventor recognized the need to reduce the number of memory accesses associated with a comparison by reusing a value corresponding to a common (or intersecting) point between two or more features. Accordingly, the techniques and apparatus described here implement algorithms for rounding features utilized in face detection processing, including applying one or more rounding rules for maintaining corresponding filter regions at an equal size ratio.

The techniques described in this specification can be implemented to realize one or more of the following advantages. For instance, the techniques can be implemented such that one or more dimensions of a feature utilized in facial detection processing can be rounded to correspond to integer pixel locations of an associated image, while the size of corresponding contrast regions in the feature are maintained at an equal ratio. The techniques also can be implemented such that rounding is controlled with respect to one or more directionally sensitive components, e.g., contrast regions, of a feature. Further, the rounding of a directionally insensitive component need not be managed. The techniques also can be implemented to permit comparing contrast regions directly, without weighting the respective contrast regions to account for differences in area. Accordingly, the number of computations required to perform a comparison of contrast regions within a feature can be reduced.

Further, the techniques can be implemented to permit generating an array of threshold values for use in contrast comparisons, such that a threshold corresponds to a predetermined feature size. Thus, the difference between corresponding contrast regions of a feature can be evaluated without having to be adjusted (or normalized) for the size of the associated area. The techniques also can be implemented to permit reusing common points between contrast regions included within a feature, such that redundant memory accesses can be eliminated.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
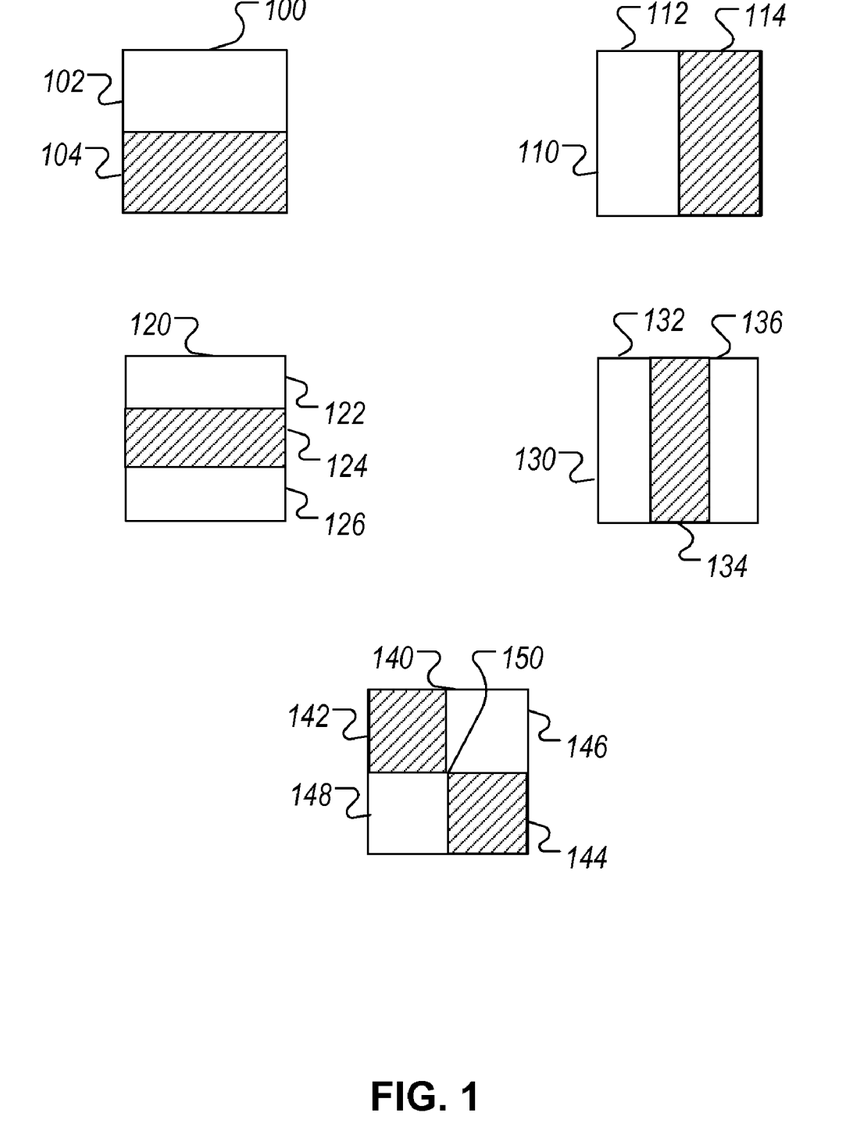
FIG. 1 shows exemplary features for use in facial detection processing.

FIG. 1 shows exemplary features for use in facial detection processing. A feature can be represented using any rectangle of any size. For instance, a feature can be defined as a 16-pixel by 4-pixel region (or window). A feature also can be scaled, e.g. up, to correspond to a different region. For instance, a feature can be defined with respect to the smallest possible face rectangle that can be detected, e.g., 20-pixels by 20-pixels, and then scaled to correspond to larger face rectangles. Further, each feature can be sub-divided into two or more rectangular regions, i.e., contrast regions, for which contrast (or intensity) is compared in a corresponding image, such as an integral image. The contrast regions are adjacent to one another in the feature, such that they share at least one common point, but do not overlap. In some implementations, the contrast regions included in a feature can be equally sized. In other implementations, two or more of the contrast regions included in a feature can be differently sized. Similarly, two or more of the contrast regions included in a feature can be equally weighted or differently weighted.

The value of a contrast region can be computed for an integral image by obtaining the values of its four corners in the integral image. Further, a feature can be scaled to cover different areas of an image. Additionally, a feature can be applied (or mapped) to different areas within the corresponding image, so that a feature can be used to evaluate numerous locations, including differently sized locations, within an image.

Each of the features can have a different combination of the number of contrast regions and the arrangement of those contrast regions. For instance, feature 100 is a two-rectangle feature in which adjacent contrast regions 102 and 104 are arranged horizontally. Feature 110 also is a two-rectangle feature. However, in feature 110, adjacent contrast regions 112 and 114 are arranged vertically.

Feature 120 illustrates a three-rectangle feature, in which adjacent contrast regions 122, 124, and 126 are arranged horizontally. In some implementations, contrast regions 122, 124, and 126 can be equally sized, while in other implementations, contrast region 124 can be sized differently than either or both of contrast regions 122 and 126. Feature 130 also is a three-rectangle feature. However, in feature 130, adjacent contrast regions 132, 134, and 136 are arranged vertically. As with feature 120, contrast regions 132, 134, and 136 can be equally sized, or contrast region 134 can be sized differently than either or both of contrast regions 132 and 136.

Feature 140 illustrates a four rectangle feature, in which the included contrast regions are not coextensive in either the horizontal or vertical dimension. Instead, contrast regions 142, 144, 146, and 148 are arranged in a checker board pattern. Contrast regions 142, 144, 146, and 148 are adjacent with respect to two edges, and all of the contrast regions include common point 150. Additionally, other types of features also can be used. For example, a center surround feature (not shown) can include an interior contrast region surrounding by an outer contrast region.

Figure 2:
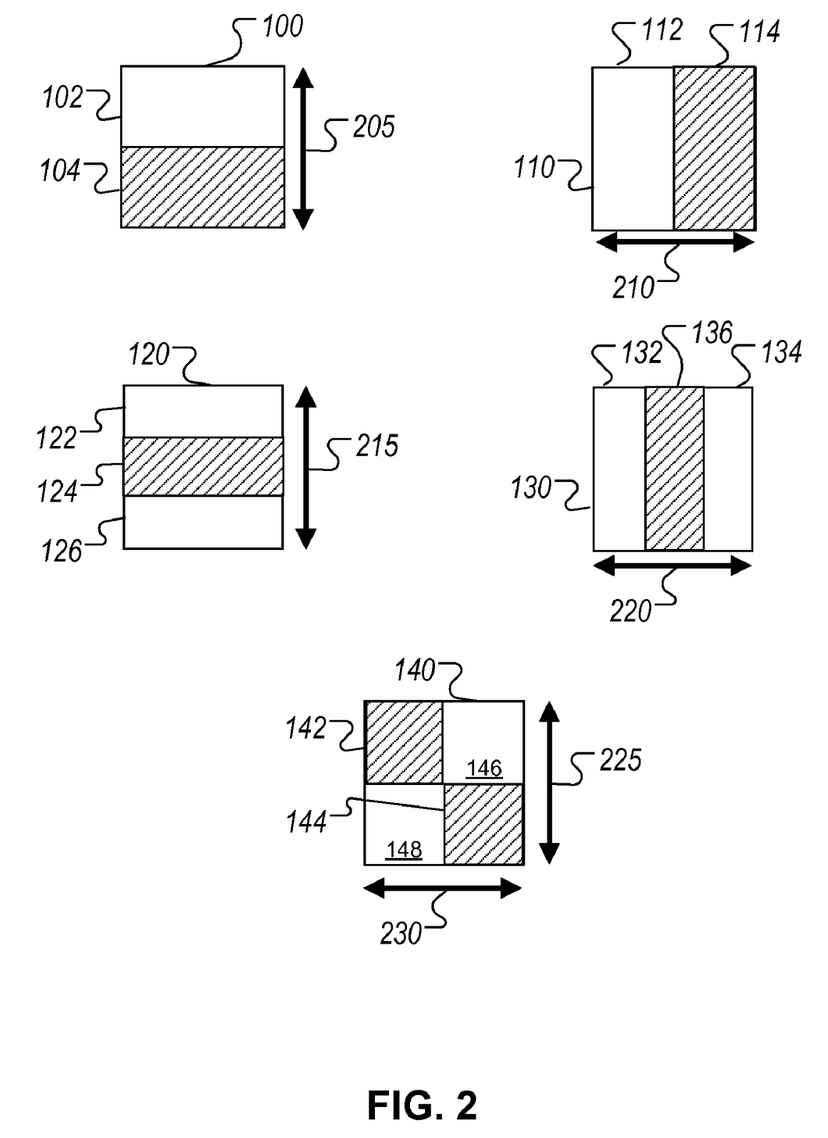
FIG. 2 shows directional components associated with exemplary features for use in facial detection processing.

FIG. 2 shows directional components associated with exemplary features for use in facial detection processing. A directional component indicates that, based on the arrangement of the included contrast regions, rounding of a feature with respect to the corresponding dimension could alter the size ratio between the contrast regions.

In feature 100, contrast regions 102 and 104 are arranged horizontally. Accordingly, feature 100 has a directional component 205 corresponding to the vertical dimension. For instance, if the vertical dimension (i.e., height) of feature 100 is rounded, the resulting feature size could be an odd value, thereby make it impossible for the size of contrast region 102 to remain equal to the size of corresponding contrast region 104. Thus, the size ratio between contrast regions 102 and 104 could not be maintained. As a result, a rounding rule can be created for feature 100, which specifies that for the vertical dimension the feature 100 must be rounded to a value that is evenly divisible by the number of contrast regions associated with the directional component 205. For instance, because contrast regions 102 and 104 are arranged horizontally in feature 100, feature 100 must be rounded, with respect to the vertical dimension, such that the number of pixel locations covered by feature 100 can be evenly divided between contrast region 102 and contrast region 104. Moreover, because there is no directional component with respect to tie horizontal dimension of feature 100, the horizontal dimension can be rounded to any integer pixel value. As both contrast regions will be rounded by the same amount, the size ratio between contrast regions 102 and 104 can be maintained.

Figure 3:
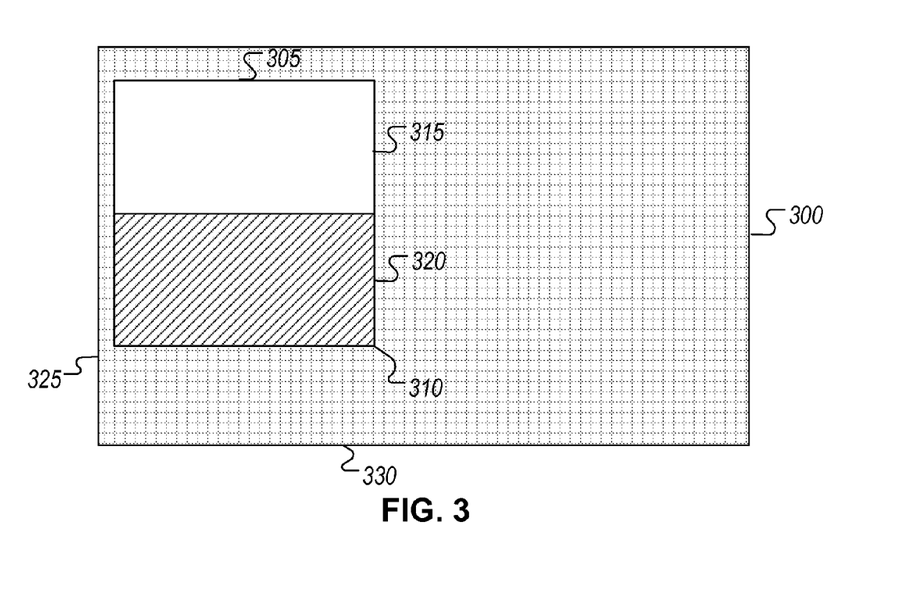
FIGS. 3 and 4 show exemplary features positioned at non-integer pixel locations with respect to a corresponding image.

FIG. 3 shows an exemplary feature positioned at a non-integer pixel location with respect to a corresponding image. Feature 305 can be positioned with respect to image 300, e.g., an integral image, such as during facial detection processing. The position of feature 305 can be such that a corner (or vertex), e.g., corner 310, is located at a non-integer (or fractional) pixel location. In order to compute the feature score, at least one dimension of feature 305 must be rounded such that all corners are located at integer pixel locations.

Feature 305 includes upper contrast region 315 and lower contrast region 320, which are arranged horizontally. Thus, feature 305 has a directional component with respect to the vertical dimension. If feature 305 is rounded to the nearest integer pixel location with respect to the vertical dimension 325 of image 300, it is possible that the height of feature 305 will change. A change to the height of feature 305 could result in a change to the ratio between the size of upper contrast region 315 and the size of lower contrast region 320. For instance, the height of upper contrast region 315 could remain the same, while the height of lower contrast region 320 could increase or decrease by one pixel. As a result, a comparison between the score for upper contrast region 315 and the score for lower contrast region 320 could result in an error, e.g. a false indication of the difference in contrast or intensity, unless the scores are normalized for size.

A rounding rule can be associated with a feature that specifies how the feature can be rounded when at least one vertex is positioned at a non-integer pixel location. Further, the rounding rule can account for any directional components of the feature. For instance, with respect to feature 305, the rounding rule can restrict rounding vertically, such that any inequality between upper contrast region 315 and lower contrast region 320 can be prevented. The rounding rule can specify a rounding factor for use in rounding feature 305 in the vertical dimension, such that the vertical size (or height) of upper contrast region 315 and lower contrast region 320 remains equal. In some implementations, the rounding factor can be an integer equal to the number of contrast regions that result in the directional component, e.g., two. Thus, one or more faces or vertices of feature 305 can be rounded vertically to an integer pixel location, as long as the resulting pixel locations will result in a feature height that is evenly divisible by two. As a result, the ratio between the sizes of upper contrast region 315 and lower contrast region 320 can be maintained.

Further, the rounding rule can be structured to be indifferent to rounding for a dimension of a feature that does not have a directional component. For instance, in feature 305, both upper contrast region 315 and lower contrast region 320 are coextensive with respect to the horizontal dimension 330. Accordingly, one or more faces or vertices of feature 305 can be rounded horizontally to any integer pixel location without changing the ratio between the sizes of upper contrast region 315 and lower contrast region 320.

Figure 4:
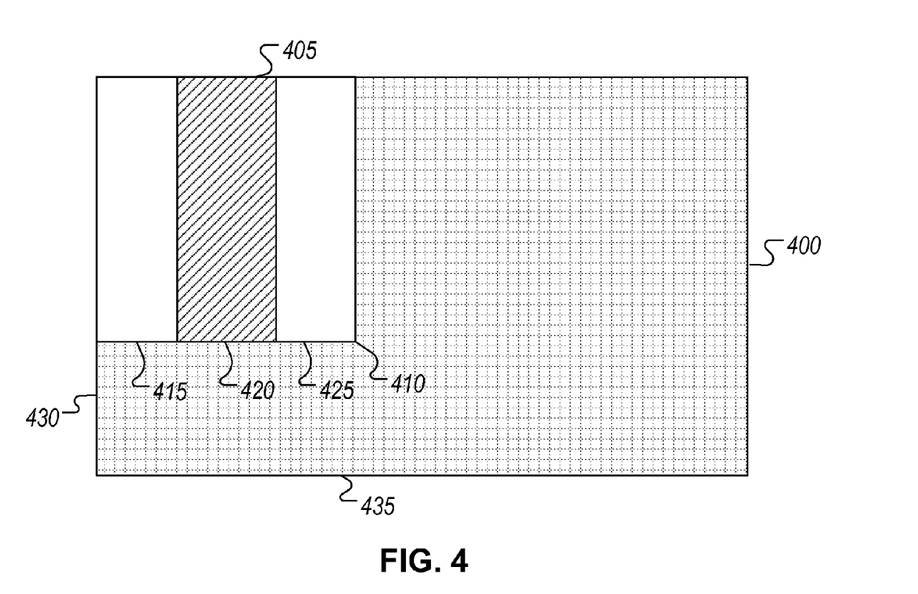

FIG. 4 shows an exemplary feature positioned at a non-integer pixel location with respect to a corresponding image. Feature 405 is positioned with respect to image 400, e.g., an integral image, such that corner 410 is located at a non-integer pixel location. Feature 405 includes left contrast region 415, center contrast region 420, and right contrast region 425, which are arranged vertically. Thus, feature 405 has a directional component with respect to the horizontal dimension. If feature 405 is rounded to the nearest integer pixel location with respect to the horizontal dimension 430 of image 400, it is possible that the width of feature 405 will change. A change to the width of feature 405 can result in a change to the ratio between the size of left contrast region 415, center contrast region 420, and right contrast region 425. For instance, the width of right contrast region 425 can increase or decrease by one pixel, while the width of the remaining contrast regions remains the same. As a result, a comparison between the scores for left contrast region 415, center contrast region 420, and right contrast region 425 could result in an error, e.g. a false indication of the difference in contrast or intensity, unless the scores are normalized for size.

A rounding rule associated with feature 405 can be configured to restrict rounding horizontally, such that any inequality between the included contrast regions can be prevented. Further, the rounding rule can specify a rounding factor for use in rounding feature 405 in the horizontal dimension, such that the horizontal size (or width) of left contrast region 415, center contrast region 420, and right contrast region 425 remains equal. In some implementations, the rounding factor can be an integer equal to the number of contrast regions that result in the directional component, e.g., three. Thus, one or more faces or vertices of feature 405 can be rounded horizontally to an integer pixel location, as long as the resulting pixel locations will result in a feature width that is evenly divisible by three. As a result, the amount by which feature 405 is rounded can be evenly distributed between the included contrast regions and the ratio between the sizes of the contrast regions can be maintained.

Further, the rounding rule can be structured to be indifferent to rounding for a dimension of a feature that does not have a directional component. Additionally, for a feature having a directional component with respect to both height and width, a single rounding factor can be specified or separate rounding factors can be specified based on the respective directional components.

Figure 5:
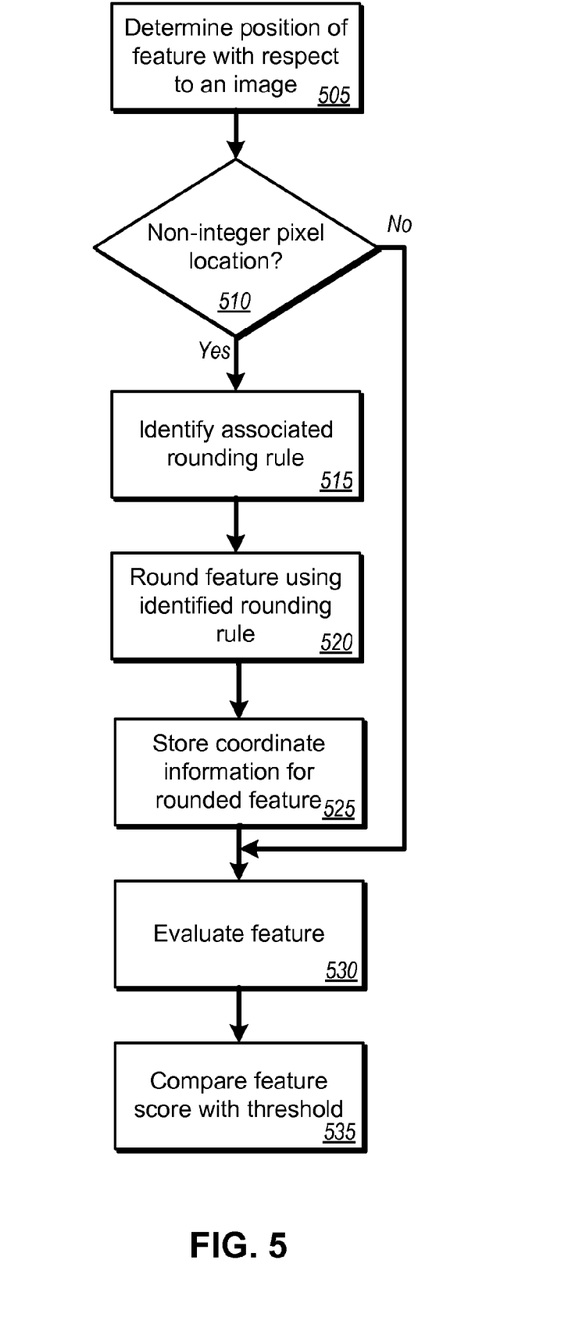
FIG. 5 shows an exemplary process for rounding a feature.

FIG. 5 shows an exemplary process for rounding a feature. The position of a feature with respect to an image, such as an integral image, can be determined (505). For instance, the position of the feature can be determined during a facial detection process, during which different image locations are evaluated to determine whether image information representative of a face is present. The position of the feature further can be evaluated to determine whether a vertex (or an edge/face) of the feature is positioned at a non-integer pixel location (510). If none of the vertices (or edges/faces) are positioned at a non-integer pixel location, the feature can be evaluated (530).

If a vertex (or edge/face) is positioned at a non-integer pixel location, a rounding rule associated with the feature can be identified (515). The rounding rule can specify one or more restrictions with respect to rounding a dimension of the feature. For instance, the rounding rule can limit the rounding of a feature with respect to a dimension having an associated directional component. The rounding can performed, in response to the rule, such that a ratio between the sizes of corresponding contrast regions is maintained. Further, the rounding rule can specify a rounding factor, which can be a positive integer value, such as the number of contrast regions corresponding to the dimension being rounded. Additionally, the rounding rule can be defined such that a dimension of the feature that does not have an associated directional component can be rounded to any integer pixel location, e.g., the closest adjacent integer pixel location.

The feature can be rounded using the identified rounding rule (520). The feature needs only to be rounded once for a given face size. As a result of the rounding, each vertex of the feature will be positioned at an integer pixel location. Further, the coordinate location (x, y) corresponding to each rounded vertex can be stored in a data structure, such as an array (525). Thus, the coordinate location can be retrieved subsequently for use in evaluating the feature. In some implementations, an offset into the integral image is stored in place of or in addition to the coordinate location. Additionally, one or more threshold values corresponding to the feature also can be updated to reflect the scaling applied to the feature. The threshold values can be stored in a data structure, e.g. an array, that is separate from or combined with the data structure storing coordinate and/or offset information. The threshold value can be adjusted to reflect the scaling, such that the threshold accurately corresponds to the area of the feature. For instance, if the feature was scaled by horizontal factor $S_x$ and vertical factor $S_y$ in accordance with the rounding, the threshold can be scaled by $S_x \cdot S_y$ to generate a new threshold for the resulting scaled feature.

Once the feature has been rounded, the feature can be evaluated (530). For instance, a feature score can be determined, such as based on scores for the included contrast regions. The feature score can represent a difference between two or more contrast regions. Additionally, the feature score can be compared with a predetermined threshold (535). For instance, a threshold associated with the feature can be retrieved from a data structure, such as an array. As discussed above, the threshold value can be an adjusted value that reflects scaling of the corresponding feature. In some implementations, the same threshold can be associated with multiple features.

Figure 6:
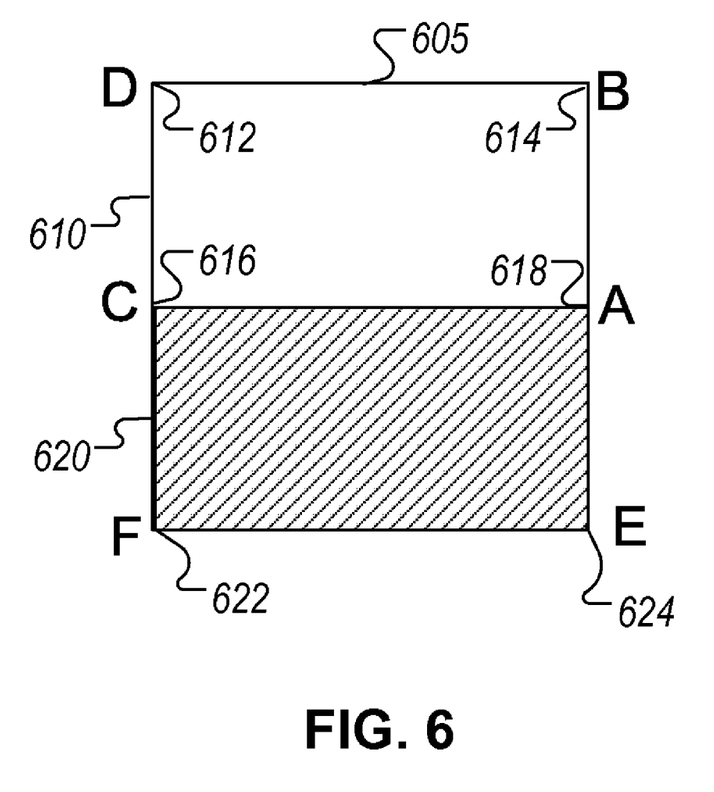
FIG. 6 shows the locations of an exemplary feature that are retrieved from memory to compute the feature score.

FIG. 6 shows the locations of an exemplary feature that are retrieved from memory to compute the feature score. As discussed above, a feature can be evaluated with respect to an integral image, which represents, for each pixel location (x, y), the sum of the pixel values above and to the left of the location (x, y), inclusive. The score for a feature can be determined based on the scores for the included contrast regions. In turn, the score for a contrast region of can be determined from the integral image using the values of the integral image at the corners of the rectangle representing the contrast region. For instance, the sum of the image values, from the original image, that are located within the contrast region can be computed by adding the integral image value at the bottom right corner of the contrast region to the integral image value at the top left corner and subtracting therefrom the integral image value at the top right corner and the integral image value at the bottom left corner. Thus, the sum of the original image pixel values, which represents the contrast region score, can be determined using four memory accesses.

The score for each contrast region in a feature can be determined based on the integral image values at the four corners of the contrast region. However, because contrast regions within a feature are adjacent, the number of memory accesses required to retrieve the integral image values can be reduced through reuse. FIG. 6 shows two-rectangle feature 605, which includes upper contrast region 610 and lower contrast region 620. The score for upper contrast region 610 can be computed as:

Score=Corner *A* 618−Corner *B* 614−Corner *C* 616+ Corner *D* 612

The values for the corners A, B, C, and D can be accessed from a memory storing the values of the integral image.

Because upper contrast region 610 and lower contrast region 620 are adjacent, both contrast regions share the corners A and C. Thus, the score for lower contrast region 620 can be computed as:

Score=Corner *E* 624−Corner *A* 618−Corner *F* 622+ Corner *C* 616

As the integral image values corresponding to corner A 618 and corner C 616 were accessed to compute the score for upper contrast region 610, the values do not need to be retrieved again to compute the score for lower contrast region 620. By reusing the values, the number of memory accesses needed to compute the contrast region scores for two-rectangle feature 605 can be reduced by two, from eight to six. Further, shared corners can be reused for any feature, without regard to the number of included contrast regions. For instance, through reuse, the number of memory accesses required to compute the contrast region scores for a three-rectangle feature (not shown) can be reduced by four, from twelve to eight.

Figure 7:
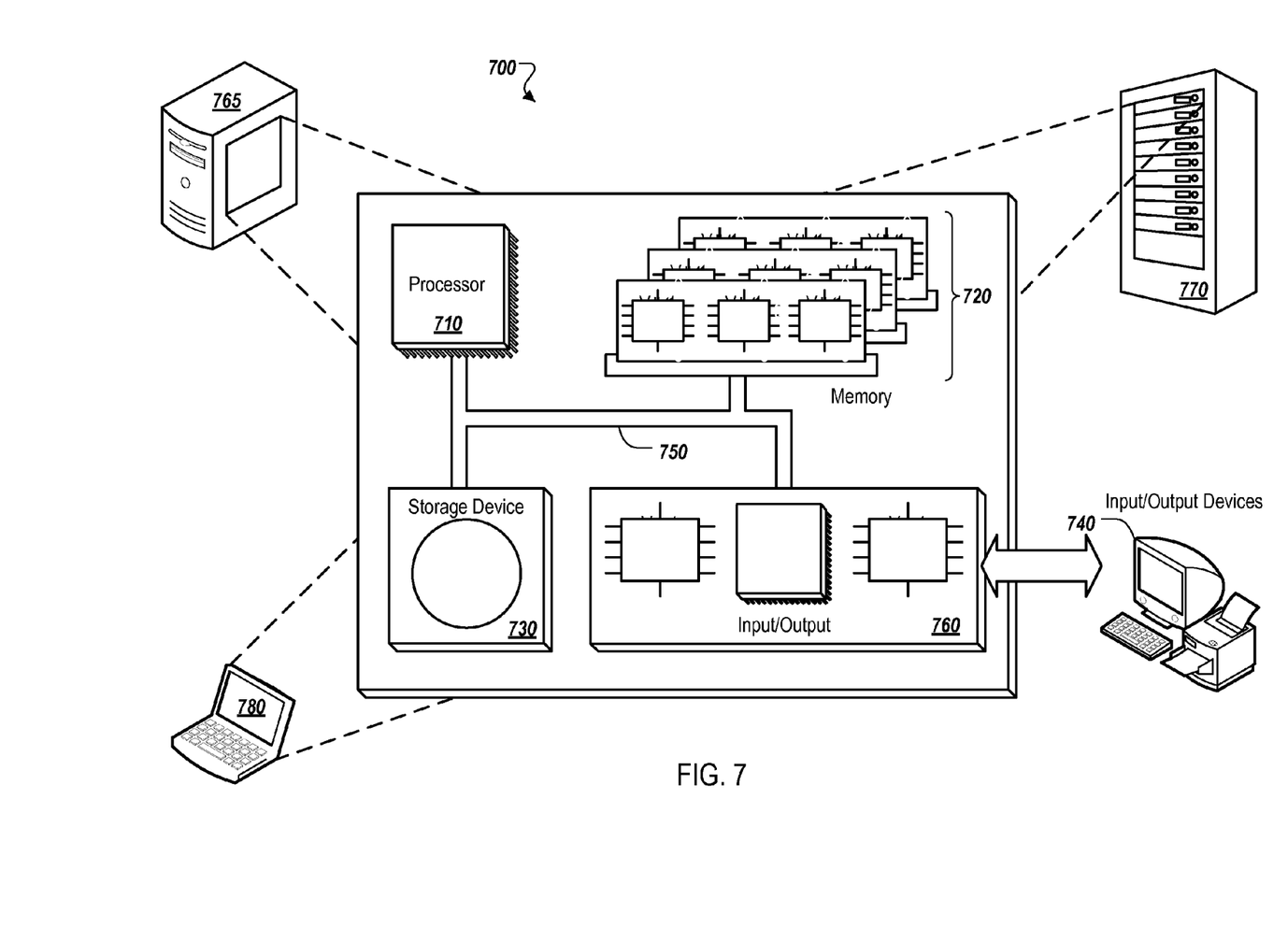
FIG. 7 shows an exemplary computing system for performing facial detection processing, including feature rounding and memory access reduction techniques.

FIG. 7 shows an exemplary computing system for performing facial detection processing, including the feature rounding and memory access reduction techniques described above. Computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 700 includes processor 710, memory 720, storage device 730, and high-speed interface 750. Further, computing device 700 can include one or more high-speed expansion ports (not shown) and a low speed interface (not shown) connected to a low speed bus (not shown), which can interface with one or more included components, such as storage device 730. Processor 710 can be configured to process instructions for execution within computing device 700, including instructions stored in memory 720 or on storage device 730, to display graphical information for a GUI on an external input/output device, such as display 740 coupled to input/output interface 760. In other implementations, multiple processors and/or multiple buses can be used, as appropriate, along with multiple memories and types of memory. Also, multiple computing devices 700 can be connected, with each device providing one or more portions of the necessary operations (e.g., as a server bank, a group of blade servers, or a multi-processor system).

Memory 720 can be configured to store information within computing device 700. For instance, memory 720 can be a computer-readable medium, such as one or more volatile or non-volatile memory units. Storage device 730 is capable of providing mass storage for computing device 700. For instance, storage device 730 can be a computer-readable medium, such as a floppy disk device, a hard disk device, an optical disk device, a tape device, a flash memory or other similar solid state memory device, or an array of devices, including devices in a storage area network. In some implementations, a computer program product can be tangibly embodied in an information carrier. The computer program product can contain instructions that, when executed, perform one or more methods, such as those described above. The information carrier can be, e.g., a computer- or machine-readable medium, such as memory 720, storage device 730, or memory on processor 710.

A high speed controller can be configured to manage bandwidth-intensive operations for computing device 700, while a low speed controller can be configured to manage less bandwidth-intensive operations. Such allocation of duties is exemplary only. In some implementations, the high-speed controller is coupled to memory 720, display 740 (e.g., through a graphics processor or accelerator), and to high-speed expansion ports (not shown), which can accept various expansion cards (not shown). Further, the low-speed controller (not shown) can be coupled to storage device 730 and one or more low-speed expansion ports (not shown). A low-speed expansion port can be one of various communication ports (e.g., USB, Bluetooth, Ethernet, wireless Ethernet) and further can be coupled to one or more input/output devices, such as a keyboard, a pointing device, a scanner, or a networking device such as a switch or router, e.g., through a network adapter.

Computing device 700 can be implemented in a number of different forms, as shown in FIG. 7. For example, it can be implemented as server 765 or as several of such servers. Computing device 700 also can be implemented as one or more portions of rack server system 770. Additionally or alternatively, computing device 700 can be implemented as a personal computer, such as laptop computer 780.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium, which can be a machine-readable storage device, a machine-readable storage substrate, a memory device, a composition of matter effecting a machine-readable propagated signal, or any combination thereof.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or any combination thereof.

A computer program (also referred to as a program, software, software application, script, or code) can be written in any form of programming language, including compiled or interpreted languages, or declarative or procedural languages, and can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows also can be performed by, and apparatus also can be implemented as, special purpose logic circuitry, e.g., an FPGA (field programmable gate array), PLD (programmable logic device) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory, a random access memory, or both. A computer includes a processor for performing instructions and one or more memory devices for storing instructions and data. Generally, a computer also will include, or be operatively coupled to receive data from or transfer data to, or both, one or more mass storage devices for storing data, e.g., magnetic, magneto-optical, or optical disks. However, a computer need not have such devices. Moreover, a computer can be embedded in another device.

Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, the processor and memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), or OLED (organic light emitting diode) monitor, for displaying information to the user and a keyboard, and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of one or more computer programs running on the respective computers.

While this disclosure contains specific implementations, these should not be construed as limitations on the scope of any claims, but rather as descriptions of features that may be specific to particular exemplary implementations. Certain features that are described in the context of separate embodiments also can be implemented in combination in a single embodiment. Conversely, various features that are described in the context of a single embodiment also can be implemented separately in multiple embodiments or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing can be advantageous. Moreover, the separation of various system components in the embodiments described above should not be understood as requiring such separation in all embodiments and it should be understood that the described program components and systems can generally be integrated together in a single software product or packaged into multiple software products.

Only a few implementations and examples are described, and other implementations, enhancements, and variations can be made based on what is described and illustrated in this disclosure.

What is claimed is:

1. A non-transitory computer-readable storage medium encoded with a computer program comprising instructions that, when executed by data processing apparatus, cause the data processing apparatus to perform operations comprising:
   identifying, for a feature, a vertex that is aligned with a non-integer pixel location of a corresponding image;
   determining that a dimension of the feature associated with a directional component of the feature is to be rounded;
   accessing a rounding rule associated with the feature, the rounding rule specifying a rounding factor by which a size ratio between contrast bands of the feature can be maintained; and
   rounding the feature in accordance with the identified rounding rule to generate a rounded feature, such that the at least one vertex is aligned with an integer pixel location of the corresponding image.

2. The non-transitory computer-readable storage medium of claim 1, further operable to cause the data processing apparatus to perform operations comprising:
   storing location information corresponding to the rounded feature in an array.

3. The non-transitory computer-readable storage medium of claim 1, further operable to cause the data processing apparatus to perform operations comprising:
   computing a feature score for the rounded feature.

4. The non-transitory computer-readable storage medium of claim 3, further operable to cause the data processing apparatus to perform operations comprising:
   accessing a threshold value corresponding to the feature, the threshold value being stored in an array; and
   comparing the computed feature score to the accessed threshold value.

5. The non-transitory computer-readable storage medium of claim 4, wherein the accessed threshold value corresponds to a size of the feature.

6. The non-transitory computer-readable storage medium of claim 1, wherein the rounding factor comprises a positive integer by which the dimension of the feature must be evenly divisible.

7. The non-transitory computer-readable storage medium of claim 6, wherein the positive integer equals a number of contrast regions included in the feature with respect to the directional component.

8. The non-transitory computer-readable storage medium of claim 1, wherein the rounding rule permits rounding a dimension not associated with a directional component of the feature to a nearest integer pixel value.

9. A method of rounding a feature, the method comprising:
   detecting that a vertex of a feature is aligned with a non-integer pixel location in a corresponding image;
   determining that the feature is to be rounded with respect to a first dimension, the first dimension corresponding to a directional component of the feature;
   accessing a rounding rule specifying a positive integer by which a value of the first dimension must be evenly divisible;
   rounding the value in accordance with the identified rounding rule, such that the vertex is aligned with an integer pixel location in the corresponding image; and
   computing a score for the feature.

10. The method of claim 9, further comprising:
    accessing a predetermined threshold value corresponding to the feature; and
    comparing the computed score to the predetermined threshold value.

11. The method of claim 10, wherein the predetermined threshold value corresponds to a size of the feature.

12. The method of claim 9, wherein the positive integer is determined based on a number of contrast regions included in the feature.

13. The method of claim 9, wherein the rounding rule permits rounding a dimension not associated with a directional component of the feature to a nearest integer pixel value.

14. The method of claim 9, wherein computing the score further comprises accessing a memory to obtain values corresponding to points associated with the feature.

15. The method of claim 14, further comprising:
    reducing a number of memory accesses associated with computing the score by accessing the memory only once for overlapping points within the feature.

16. A system comprising:
    a memory device storing an image, a feature, and a rounding rule; and
    processor electronics configured to perform operations comprising:
      evaluating the feature with respect to a portion of the image;
      identifying a vertex of the feature that is aligned with a non-integer pixel location of the image;
      determining that a dimension of the feature associated with a directional component of the feature is to be rounded;
      accessing a rounding rule associated with the feature, the rounding rule specifying a rounding factor by which a size ratio between contrast bands of the feature can be maintained; and
      rounding the feature in accordance with the identified rounding rule to generate a rounded feature, such that the at least one vertex is aligned with an integer pixel location of the corresponding image.

17. The system of claim 16, wherein the processor electronics are further configured to perform operations comprising:
    computing a feature score for the rounded feature.

18. The system of claim 16, wherein the memory device is further configured to store an array of predetermined threshold values corresponding to various feature sizes.

19. The system of claim 18, wherein the processor electronics are further configured to perform operations comprising:
    retrieving from the array a threshold value corresponding to the feature; and
    comparing the computed feature score to the retrieved threshold value.

20. The system of claim 16, wherein the rounding factor comprises a positive integer by which the dimension of the feature must be evenly divisible.

21. The system of claim 20, wherein the positive integer equals a number of contrast regions included in the feature with respect to the directional component.

* * * * *